United States Patent

Matsubayashi et al.

[11] Patent Number: 5,914,139
[45] Date of Patent: Jun. 22, 1999

[54] ELECTRIC MOTOR INJECTION APPARATUS FOR VERTICAL INJECTION MOLDING MACHINE

[75] Inventors: Kouichi Matsubayashi; Takao Shimizu; Nobusuke Takahashi, all of Nagano-ken, Japan

[73] Assignee: Nissei Plastic Industrial Co., Ltd., Nagano-Ken, Japan

[21] Appl. No.: 08/944,693

[22] Filed: Oct. 6, 1997

[30]    Foreign Application Priority Data

Oct. 8, 1996  [JP]  Japan ................................ 8-267591
Oct. 8, 1996  [JP]  Japan ................................ 8-267592
Oct. 8, 1996  [JP]  Japan ................................ 8-267595
Oct. 8, 1996  [JP]  Japan ................................ 8-267596

[51] Int. Cl.$^6$ .................................................. B29C 45/77
[52] U.S. Cl. ................. 425/145; 264/40.3; 264/40.5; 425/147; 425/169; 425/171
[58] Field of Search ........................... 425/145, 135, 425/147, 169, 171, 542; 264/40.3, 40.4, 40.5

[56]          References Cited

U.S. PATENT DOCUMENTS 3,602,962  9/1971  Odegaard et al. .................... 425/186
5,092,753  3/1992  Kumamura et al. .................. 425/145

FOREIGN PATENT DOCUMENTS 5154884  9/1996  Japan .
5253971  9/1996  Japan .

*Primary Examiner*—Tim Heitbrink
*Attorney, Agent, or Firm*—Weingarten, Schurgin, Gagnebin & Hayes LLP

[57]          ABSTRACT

An electric motor type injection apparatus for a vertical molding machine which is compact in size and can be installed on a square measure limited is provided. According to this apparatus, an improper movement due to self-weight of injection mechanism members can be prevented, and deviation of a nozzle tip resulting in the cause of damage of a nozzle tip and a gate can be corrected. The apparatus is constituted by an injection driving device comprising a lower plate, an upper plate, an injection plate movable freely between the upper and the lower plates, an injection driving means comprising a ball screw shaft and a ball nut, a driving source for the injection driving means provided on the upper plate, a metering driving source for rotating a screw; a moving mechanism comprising a pair of ball screw shafts and ball nuts so as that nozzle touches by moving the injection driving device upwardly and downwardly; and a movement driving source for rotating the ball screw shafts, wherein they are arranged in a special manner.

13 Claims, 6 Drawing Sheets

ELECTRIC MOTOR INJECTION APPARATUS FOR VERTICAL INJECTION MOLDING MACHINE

BACKGROUND OF THE INVENTION

1. Field of the Invention

This invention relates to an electric motor type injection apparatus for a vertical molding machine constituted by installing an injection apparatus longitudinally on a movable platen installed on a mold base provided on a machine bed in a manner to lift and lower freely while a heating cylinder comprised by the injection apparatus is directed downwardly.

2. Background Art

In a general electric motor type injection apparatus, an electric motor is utilized as a driving source for touching a nozzle, metering, injecting and so on. There is no problem on installing especially even though three electric motors being utilized as driving sources, because an installing space of the electric motor can be kept sufficiently in a transverse type molding machine. However the square measure of the machine bed in the case of a vertical molding machine is limited, and moreover, it has been desired from the viewpoint of stability that three electric motors are mounted on the injection apparatus in compact so that the injection apparatus can be accommodated in well-balanced conditions within the square measure of the machine bed.

Moreover, in the case of the transverse molding machine, the entire apparatus is arranged and supported on the machine bed long in the transverse direction and the direction of the movement also is in the horizontal direction, whereby movability due to self-weight of an injection driving device and an injection screw in the heating cylinder can be neglected. However, on the other hand, in the case of the vertical molding machine, the entire apparatus is arranged and extended in the longitudinal direction on the machine bed, whereby the injection driving device supported in a manner to lift and lower freely by a shaft and the injection screw or the like installed in a downward direction in the heating cylinder have tendency to move downwardly due to self-weight. A stopping position of the injection screw is made uncertain by this downward movement due to the self-weight and have tendency to overrun at a metering completion position, whereby an over packing of material tends to be caused. Moreover, when a nozzle of the injection apparatus is touched to a mold, this results in the cause of generation of the improper nozzle touch force due to the load, which the force is in excess of a setting and results in a factor of damage of the nozzle tip.

In a prior vertical molding machine utilized fluid pressure such as hydraulic pressure or air as a driving source, although the downward movement due to self-weight of an injection driving device and an injection screw can be prevented readily using the pressure as resistance, in the case of utilizing an electric motor, a solution by such prior means can not be expected, so that a new preventive measures by mechanical means has been required. As a result, in the electric motor type machine, the constitution cannot but become sophisticated inevitably compared with the prior means driven by hydraulic pressure or air, whereby this also results in increasing of a manufacturing cost.

The injection molds in the vertical molding machine are mounted on the mold base on the machine bed and on an opposite face of the movable platen installed in a manner to lift and lower freely to the mold base, said movable platen being fixed on upper ends of shafts for clamping which also serve as tie bars installed through the four corners of the mold base in a manner to move upwardly and downwardly freely, in the splitted conditions without regard to a driving source utilized therein, and a gate is provided on the central portion of the split mold on the movable platen.

The injection apparatus is centered and installed so that the nozzle of the heating cylinder tip can contact with this gate through the movable platen, and a mounting position of the injection mold also is set so that the gate can be positioned in the nozzle center. However, at exchange of the mold in the factory, the injection mold can not be set in a proper position, and therefore, the gate position is deviated slightly, whereby the normal nozzle touch can not be performed. This deviation results in the cause of damage of the nozzle tip and the gate and results in the cause of a short shot of the injection.

Hitherto, correction of the gate position after exchange of the mold is not performed, and in almost cases, the reset should be performed after detaching the mold. Because the reset of the mold should be performed by detaching not only the mold on the movable platen but also that on the mold base, the reset of the molds is troublesome and results in the molding loss, whereby in many cases, the mold is used without the reset when molding is not interfered because of the slight deviation. Therefore, in the vertical molding machine, the constitution that entering can be performed readily without the reset has been expected.

SUMMARY OF THE INVENTION

The first object of the invention is to provide an electric motor type injection apparatus wherein the injection apparatus can be made in compact in size and can be installed in well-balanced conditions on a movable platen above a machine bed of which the square measure is limited by installing electric motors for metering and for injecting on the same position longitudinally, and moreover, in a manner to not interfere each other, even though the injection apparatus provided with a plurality of electric motors as driving sources.

The second object of the invention is to provide an electric motor type injection apparatus for a vertical injection molding machine which can prevent the downward movement due to self-weight of an injection driving device and an injection screw by means of rotary braking of the electric motor to ensure stopping positions of the injection screw at the completion of metering and injecting and can prevent excessive nozzle touch force from generating by the load.

The third object of the invention is to provide an electric motor type injection apparatus for a vertical injection molding machine which can correct the deviation of the nozzle tip resulting in the cause of damage of the nozzle tip and the gate without performing reset while using a transverse movement of a bearing sheet of a upper surface of the movable platen on which the injection apparatus is installed.

This invention according to said objects is an electric motor type injection apparatus for a vertical molding machine, said vertical molding machine comprising: a mold base on a machine bed; a shaft for clamping which also serves as a tie bar provided through four corners of the mold base in a manner to move upwardly and downwardly freely; a movable platen provided in a manner to lift and lower freely to the mold base, said movable platen being fixed on an upper end of said shaft for clamping; a mold clamping mechanism accommodated in the machine bed, said mold clamping mechanism being connected with a lower end of said shaft for clamping; an injection apparatus provided on the movable platen in a manner to lift and lower freely, said injection apparatus comprising a heating cylinder and a screw installed within said heating cylinder directed downwardly, so that a nozzle tip can be located on a gate formed on a central portion of a split mold of the movable platen side, said injection apparatus comprising: an injection driving device comprising a lower plate to which a base end of said heating cylinder is connected; an upper plate above the lower plate connected by a connecting rod; an injection plate movable freely between the upper and the lower plates inserted through the connecting rod, said screw being connected rotatably to said injection plate; an injection driving means comprising a ball screw shaft and a ball nut, by which said injection plate is held to the upper plate; a driving source for the injection driving means provided on the upper plate; a metering driving source for rotating the screw provided on the injection plate; a supporting shaft mounted uprightly on an upper surface of said movable platen, said upper and lower plates being inserted and supported by said supporting shaft so as to lift and lower freely with relation to said movable platen; a moving mechanism comprising a pair of ball screw shafts and ball nuts in bearing members over said movable platen and both sides of the lower plate of the heating cylinder so as to nozzle touches by moving the injection driving device upwardly and downwardly; and a movement driving source for rotating the ball screw shafts, wherein servo motors are used as said driving source for the injection driving means and said metering driving source, both the motors are respectively mounted on said upper plate and the injection plate in an inward direction each other longitudinally at the same position, making a space for the movement of the servo motor for said metering driving source.

In such constitution, the servo motor for metering and said servo motor for injecting are located along the sides of the driving device, and both the motors can be accommodated in a space as an injection operation space between the upper plate and the lower plate, whereby the center of gravity is lowered in response to reduction of a size of the vertical injection apparatus in height to results in an apparatus with stability.

Moreover, said servo motor for injection according to the invention comprises a brake, by which the braking conditions of the ball screw shafts said of said injection driving means are held, thereby to block an advancing movement at stop of the injection screw due to self-weight of the injection plate. In addition, a driving source of said moving mechanism comprises a geared motor with a brake, by which the braking conditions of the ball screw shafts of said moving mechanism are held, thereby to block the self-rotation of the ball screw shafts by a load of the injection driving device.

In such constitution, the downward movement due to self-weight on the occasion of the completion of metering and on the occasion of the completion of injecting and packing is prevented by the brake mounted in the servo motor for injection, and when metering, stopping of the injection screw at the completion position of metering is ensured, thereby accuracy being improved, and moreover, in the case of the injection that the metered resin material can be injected completely, the movement in excess of the injection-stroke end is blocked, thereby the problems of the injection accuracy by over packing being improved.

The self-rotation is not occurred by the brake mounted in the geared motor, whereby the injection driving device can be held at the setting position to prevent generation of the improper nozzle touch force which is in excess of the setting by the load.

Furthermore, the ball screw shaft of said moving mechanism is inserted and supported rotatably at an upper end thereof through said lower plate, a lower end is screwed to the ball nut installed in the bearing member provided on said movable platen to be connected to a movable platen and a rotation by the geared motor is transmitted by said ball nut by a driving belt wound over an axial end of the ball screw projected on the lower plate and an axial end of said geared motor to move in either direction of the upper or the lower by said ball nut in the bearing member, thereby said injection driving device being moved upwardly and downwardly to the movable platen.

Moreover, said bearing member is provided with said ball nut movably only in the direction of the axis therein, and an apparatus for maintaining a nozzle touch force is constituted by a spring member for elastic pressurization which knocks up against to contact with the ball nut thereof in a cover member fixed to the upper to form a required space, a proximity switch installed on the side of the cover member thereof, and a detecting element mounted on the ball nut and located at a space underside the proximity switch.

In such constitution, elastic repulsing force by deflection of the spring member for elastic pressurization acts as the nozzle touch force, and the spring force acts against thermal expansion to allow to maintain the nozzle touch force in setting. Moreover, the geared motor is disposed to the lower plate of the injection driving device and the ball nut is disposed to the movable platen, thereby a working space can be kept on the movable platen.

Furthermore, said supporting shaft is installed on both sides of an opposite corner of the bearing sheet having an insertion hole for the heating cylinder tip, and a bearing member is installed longitudinally on both sides of a central portion of the bearing sheet, and the bearing sheet is placed on an upper surface of said movable platen movably in a transverse direction to install said injection driving device in a manner to lift and lower freely to the movable platen so that positioning of the nozzle tip of the heating cylinder and the gate of said mold can be performed by the lateral movement of the bearing sheet. In addition, said the bearing sheet has loose holes as stopping holes fitted and installed in the four sides by a pair, and on the upper surface of the movable platen placed the bearing sheet, a receiving member which is located in the central portion of the side edge of the bearing sheet and on which nozzle centering screw is mounted by screwing from the outside horizontally is installed in a manner to project, and the bearing sheet installed within the movable platen surface inside the receiving member is secured slidably in a transverse direction by a bolt inserted to said stopping holes.

In such constitution, releasing the bolt or the screw and the machine screws, the movement in a transverse direction becomes possible because the stopping holes are the loose holes. Moreover, because the centering screw of the nozzle knocks up against to contact with the side surfaces of the four sides of the bearing sheet, the injection driving device is moved in a transverse direction with the bearing sheet by turning operation of the screws and the machine screws, thereby the position of the nozzle tip with relation to the gate being corrected.

This correction of the nozzle touch position by sliding of the bearing sheet can be performed with the set injection mold as it is, whereby it can be performed readily in the factory, thereby damage of the nozzle tip and the gate by deviation of the nozzle touch to be prevented.

DETAILED DESCRIPTION OF THE PREFERRED EMBODIMENTS

Figure 1:
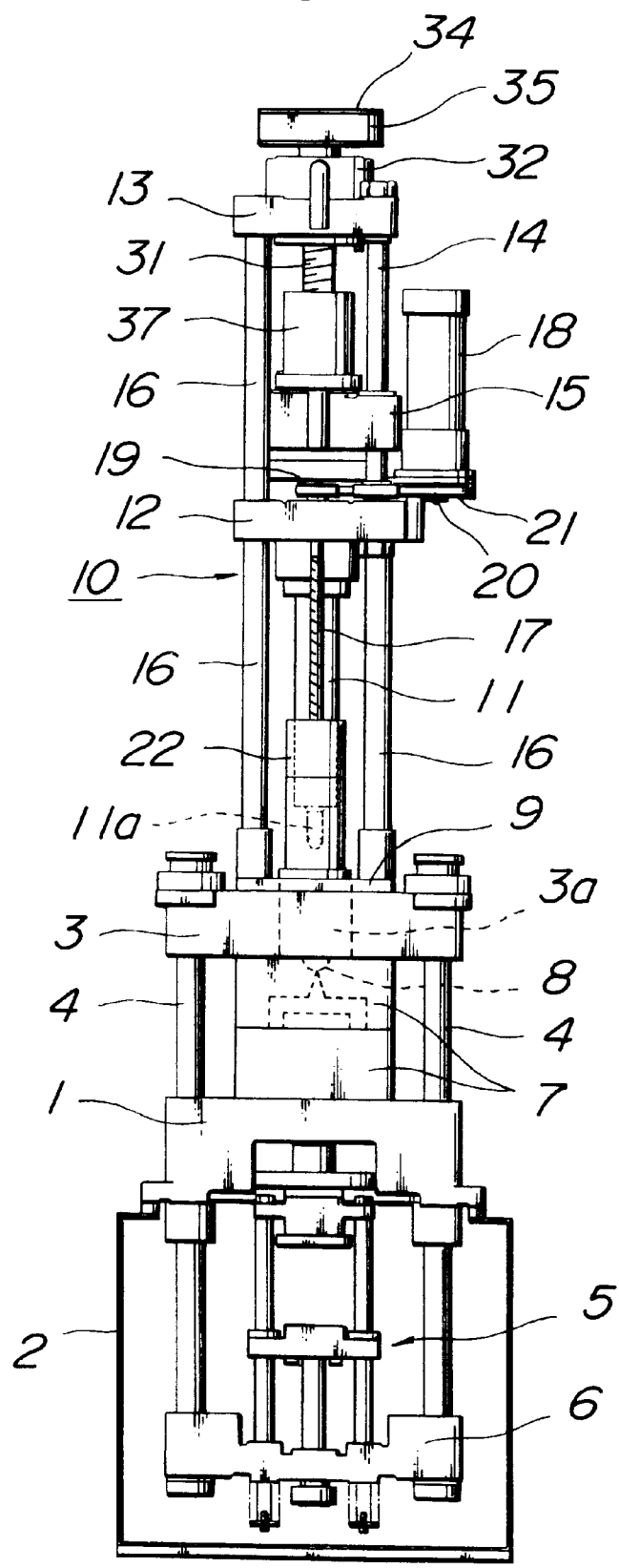
FIG. 1 is a side view of a vertical injection molding machine with an electric motor type injection apparatus according to the present invention.
Figure 2:
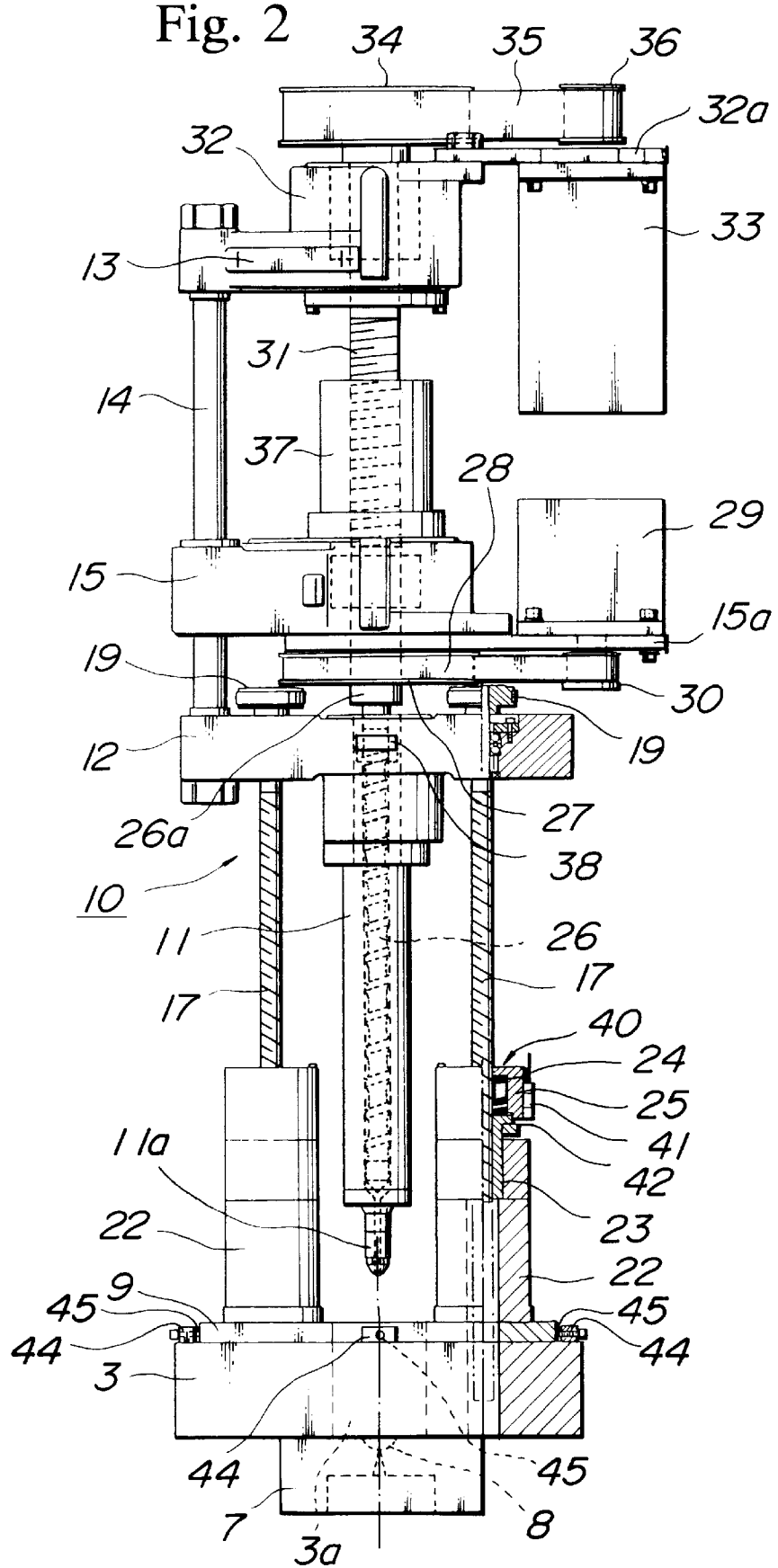
FIG. 2 is a front elevation of an electric motor type injection apparatus according to the present invention.
Figure 3:
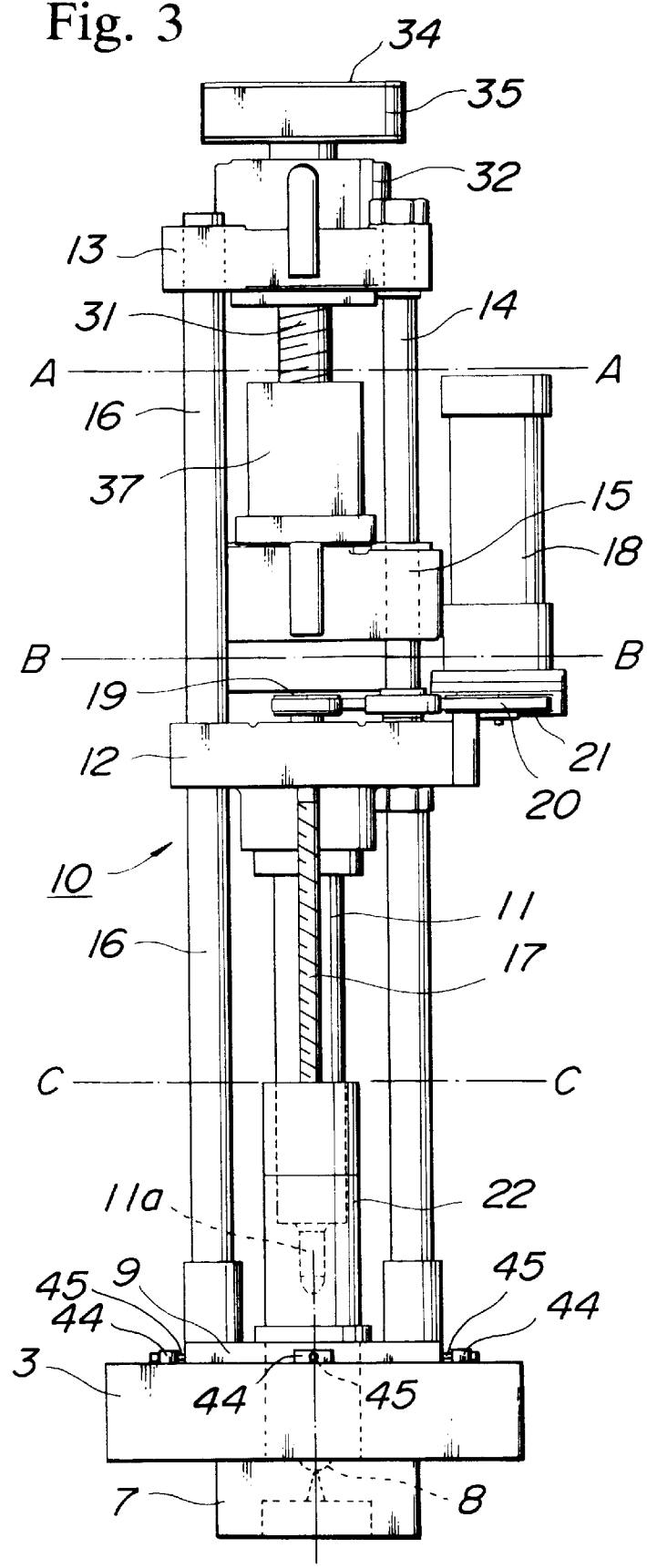
FIG. 3 is a side view of an electric motor type injection apparatus according to the invention.
Figure 4:
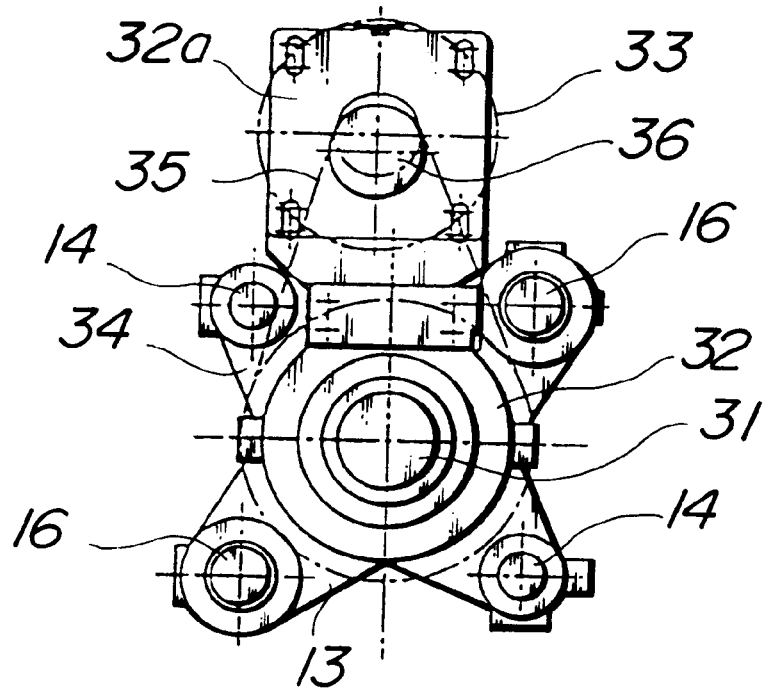
FIG. 4 is a schematic plan view of an electric motor type injection apparatus according to the present invention.
Figure 5:
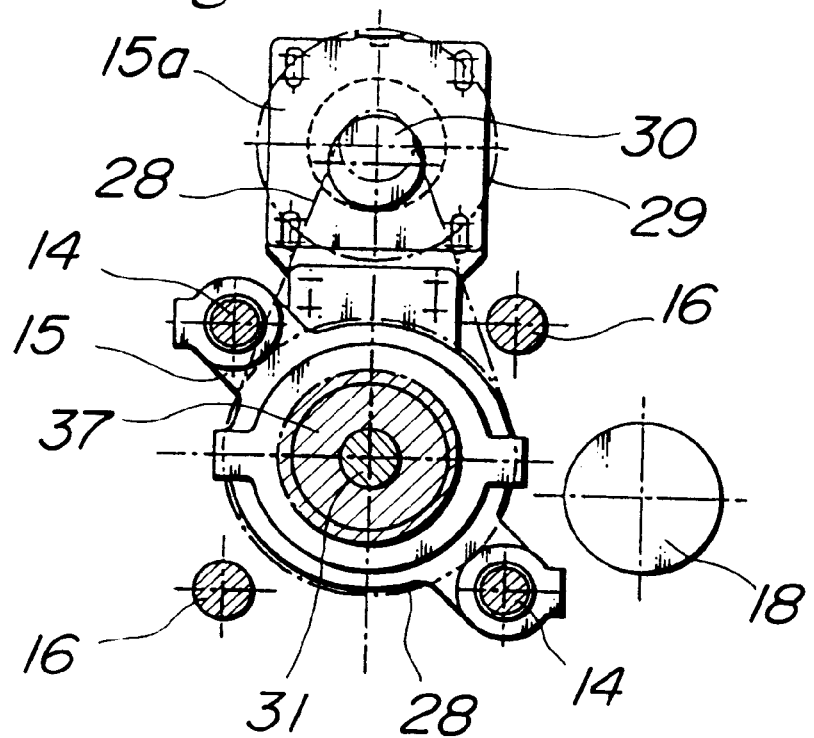
FIG. 5 is a schematic sectional view along line A—A in FIG. 2.
Figure 6:
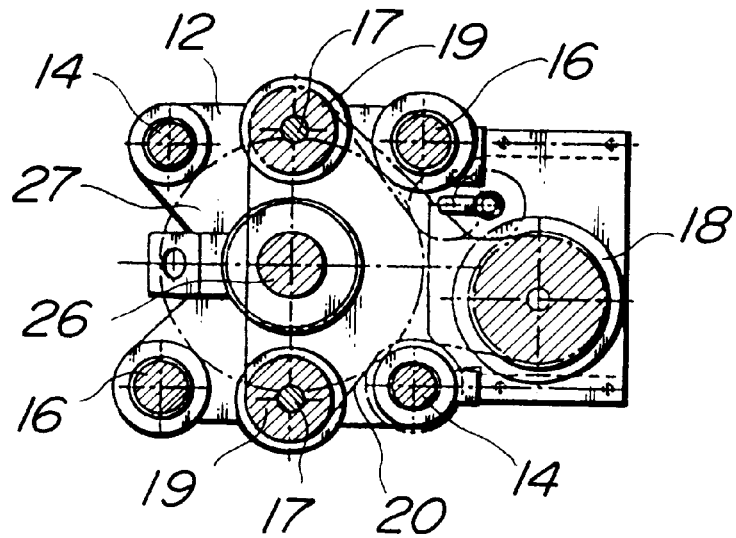
FIG. 6 is a schematic sectional view along line B—B in FIG. 2.
Figure 7:
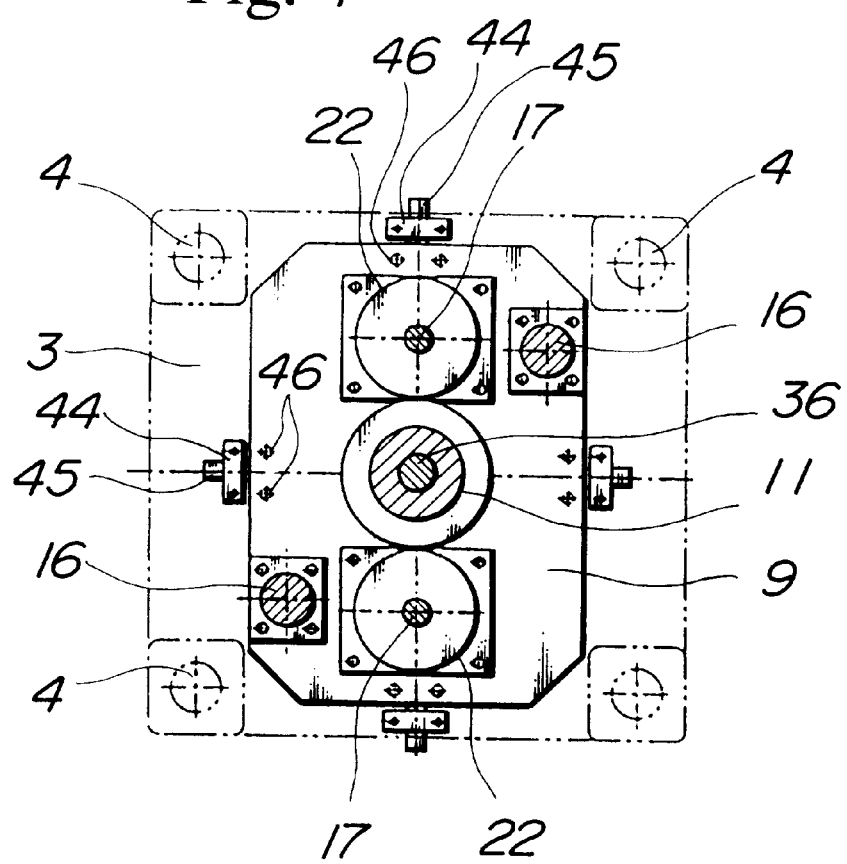
FIG. 7 is a schematic sectional view along line C—C in FIG. 2.

In FIG. 1, numeral 1 designates a mold base mounted and fixed on a upper surface of a machine bed 2 horizontally, numeral 3 designates a movable platen which is installed on the mold base 1 in a manner to move upwardly and downwardly freely, and is fixed on upper ends of shafts 4,4 for clamping which also serve as tie bars installed through the four corners of the mold base 1.

Numeral 5 designates a clamping device comprising a longitudinal toggle installed inside the machine bed 2, and said lower ends of the shafts 4,4 for clamping are connected to a clamping operation plate 6 of the lower of the toggle expanding and contracting upwardly and downwardly by reaction force against the mold base side.

On opposite surfaces of the mold base 1 and the movable platen 3, an injection mold 7 is installed in the splitted conditions, and at the central portion of the upper of the split mold on the movable platen side, a gate 8 is formed. Moreover, on an upper surface of the movable platen 3, a bearing sheet 9 is provided slidably freely in a transverse direction. An injection apparatus 10 is installed on the bearing sheet 9 so that a nozzle tip 11a thereof is positioned to said gate through the movable platen 3 and a heating cylinder 11 having an injection screw 26 therewithin is directed downwardly.

This injection apparatus 10 has an injection driving device comprising: as well as a lower plate 12 with which the basic end of said heating cylinder 11 is connected and an upper date 13 above the plate 12 being joined by a pair of connecting rods 14, 14, making a required space, while the injection screw being connected rotatably to an injection plate 15 movable freely between the upper and lower plates 12, 13 inserted through the connecting rods 14, 14, on the other hand, the injection plates 15 being held on the upper plate 13 through an injection driving means, as well as a driving source for the injection driving means being provided to the upper plate 13, an metering driving source for rotating the screw being provided to the injection plate 15, the upper and the lower plates 12 and 13 being inserted and supported by supporting shafts 16, 16 mounted uprightly on the opposite corners of said bearing sheet 9 movably, installed in a manner to lift and lower freely with relation to said movable platen 3.

This injection apparatus 10 further comprises a moving mechanism constituted by a pair of ball screw shafts 17 for moving and ball nuts 23 within bearing members 22 over the lower plate 12 beside the heating cylinder 11 and said movable platen 3.

The upward or downward movement of said injection driving device by this moving mechanism is performed by a geared motor 18 with a brake mounted on an overhanging of the side of the lower plate 12 in a downward direction as a movement driving source. Pulleys 19, 19 and 21 are mounted on a driving shaft of the geared motor 18 and shaft ends of the ball screw shafts 17 bearing the upper end thereof by the lower plate 12 pivotally freely to project over the plate, and forward or backward rotation of the geared motor 18 can be transmitted by a driving belt 20 wound over the pulleys to the ball screw shafts 17.

Moreover, the lower ends of the ball screw shafts 17, 17 are inserted inside a pair of cylindrical bearing members 22, 22 provided longitudinally on both sides of a central portion of the bearing sheet 9, and are screwed to the ball nuts 23 in an upward direction installed in the respective inside movably only in the direction of the axis, and the rotation is changed into a linear motion by the ball nuts 23, whereby the injection driving device can be moved by the ball screw shafts 17, 17 upwardly and downwardly. Lowering of the injection driving device is performed until the tip of said heating cylinder 11 enters into a through hole 3a of the movable platen 3 and the nozzle tip 11a touches with the gate 8 of the injection mold 7.

Figure 8:
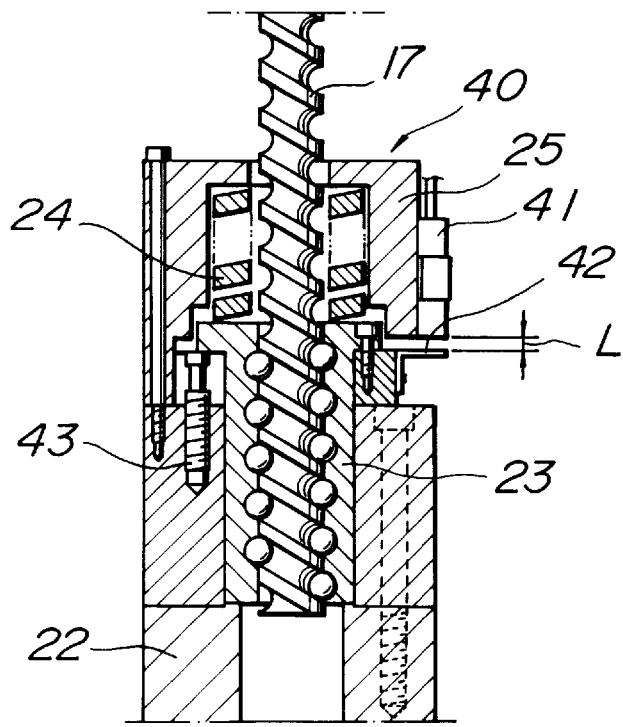
FIG. 8 is a longitudinal sectional view of a nozzle touch maintaining apparatus according to the present invention.
Figure 9:
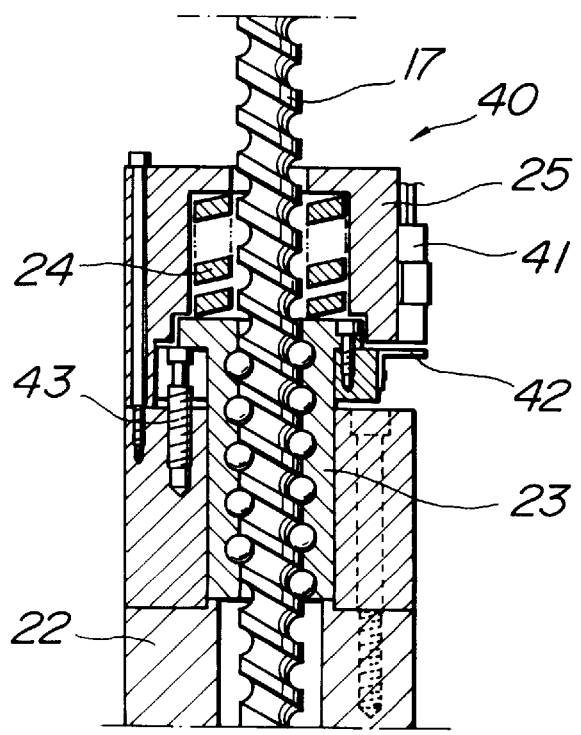
FIG. 9 is a longitudinal sectional view of a nozzle touch maintaining apparatus at nozzle touching.

A nozzle touch maintaining apparatus 40 is installed on each of the upper of said ball nuts 23 as shown in FIGS. 8 and 9.

This apparatus comprises a cover member 25 fixed in a required space formed between the upper of the bearing member 22 and the member 25, a spring member 24 for elastic pressurization which knocks up against to contact with the upper of the ball nut 23, a proximity switch 41 installed on the side of the cover member 25 in a downward direction, a detecting element 42 installed on the ball nut in said space under the proximity switch 41 and, a rotation stopping pin 43 of the detecting element 42.

On the injection plate 15 of said injection driving device, a basic shaft 26a of the injection screw 26 through said lower plate 12 is mounted rotatably, and a servo motor 29 as a metering driving source is mounted in a downward direction on an overhanging plate 15a of the side of the plate 15. A driving belt 28 is wound on a pulley 27 for metering installed on a periphery of said basic portion 26a between the lower plate 12 and an injection plate 15, and on a pulley 30 of the servo motor 29 for metering.

Said upper plate 13 is formed with a bearing member 32 of a ball screw shaft 31 for injecting integrally, and a servo motor 33 with a brake is mounted on an injection plate 32a of the side of the bearing member 32 as an injection driving source on the same position in an upward direction as overlapping with said servo motor 29 for metering.

A pulley 34 for injecting is mounted on an end of the ball screw shaft 31 projected on the bearing member 32. A driving belt 35 is wound over the pulley 34 and a pulley 36 of a driving shaft end of the servo motor 33 for injecting.

Said servo motor 29 for metering and the servo motor 33 for injecting are mounted on the overhanging plates 32a and 15a of the bearing member 32 and the injection plate 15 respectively, projecting in the same direction horizontally respectively, the servo motor 29 for metering is mounted in a downward direction and the servo motor 33 for injecting is mounted in an upward direction on the same axis longitudinally, making a space for the movement of the servo motor 29 for metering so as to not interfere each other on the occasion of the lifting movement of the injection plate 15.

Said ball screw shaft 31 for injecting projects and is lengthened below the bearing member 32 to be screwed to a cylindrical ball nut member 37 of the upper of the injection plate 15 positioned below to form the same injection driving means by means of a screw shaft and a nut as said moving mechanism to move the injection plate 15 cooperating with the ball nut 37 downwardly along said connecting rod 14 as a guide or upwardly depending on the rotation direction by rotation of the ball screw shaft 31 at a set position. In response to the movement, said injection screw 26 which is born by the injection plate 15 also moves within the heating cylinder to perform an injection of metered resin.

On the upper surface of the movable platen 3, flat rectangle receiving members 44, 44 which are located in the central portion of the side edges of the four sides of the bearing sheet 9 project and are provided, and nozzle centering screws 45, 45 for the nozzle tip 11a are mounted by screwing from the outside horizontally on the receiving members 44. After the bearing sheet 9 is installed in the plane of the movable platen inside the receiving members 44, 44 with the injection driving device and is temporarily fixed loosely by bolts 46, 46 inserted in loose holes provided as stopping holes by a pair on the four sides of the sheet, centering of the nozzle with relation to the gate 8 of the split mold set on a lower surface of the movable platen 3 is performed.

The bearing sheet 9 is pressurized toward the side by releasing or fastening said centering screws 45, 45 of the opposite position or the four sides of which the tip knocks up against to contact with the side face of the bearing sheet by turning respectively and is allowed to slide on the upper surface of the movable platen, thereby the centering being performed. Although this sliding movement is limited within the range of the loose holes, centering is concluded with the a slight movement, whereby the loose hole can be available sufficiently. After completion of centering, the bearing sheet 9 is secured completely by fastening the bolts 46, 46 regularly.

In the molding machine according to the aforementioned constitution, when the movable platen 3 is drawn down to perform the clamping of the injection mold 7 by extension of the toggle of said clamping mechanism 5, said geared motor 18 for moving is started. Rotating force of the motor is transmitted to the ball screw shafts 17, 17, and the ball screw shafts 17, 17 rotate forward to move downwardly by the ball nuts 23 in said bearing members 22. Therefore, the lower plate 12 is pulled, and the injection driving device is lowered along said supporting shafts 16, 16 as a guide, so that the nozzle tip 11a touches with the gate 8.

When rotation torque still affects on the ball screw axis 17 after nozzle touching, since the ball screw shafts 17 rotate at the home position, the ball nuts 23 are moved upwardly as well as to compress the spring member 24 for elastic pressurization to contract a spacing (L) between the proximity switch 40 and the detecting element 42 to actuate the proximity switch 40 to stop the geared motor 18 for moving. At the same time, the brake acts to stop the rotation of the ball screw shafts 17, 17 and to prevent them from rotating backward by a load of the injection driving device. The elastic repulsing force by deflection of the spring member 24 for elastic pressurization is changed to nozzle touch force, and further, a spring force can be applied against thermal expansion, whereby nozzle touch force can be kept constant approximately.

When completing nozzle touch, said servo motor 33 for injecting is started to transmit the rotating force to the ball screw shaft 31 by the driving belt 35 to move said injection plate 15 with said ball nut member 37 downwardly by forward rotation of the screw shaft. Therefore, the injection screw 36 below the plate also moves downwardly to advance within the heating cylinder 11 to inject and fill the metered molding materials into the cavity of the injection mold formed by clamping.

Moreover, in the case of the injection that the metered resin material is injected completely where no resin as a cushion is remained, the brake is actuated to maintain the injection screw 26 in the position, upon stopping of the servo motor 33 for injecting when reaching to the stroke end of injection.

When dwelling is completed after completion of injection, the servo motor 29 for metering is started with nozzle touch as it is, and the servo motor 33 for injecting is actuated and rotates backward to apply back pressure to the injection screw 36. Rotating force of the servo motor 29 for metering is transmitted to the injection screw 36 by the driving belt 30, and the injection screw 36 is moved backward by material pressure while plastificating molding materials from a feeder 38 to perform metering.

After completion of metering, the servo motor 29 for metering is stopped, and the servo motor 33 for injecting is actuated and rotates forward again to move the injection screw 36 forward to perform the injection of the metered material.

For releasing nozzle touch after the injection, after both motors are stopped, the brake of the geared motor 18 for moving is released to actuate and the motor is rotated backward. Therefore, the ball screw shafts 17, 17 for moving rotate backward to move upwardly to push the lower plate 12 upwardly to move the injection driving device upwardly. Lifting to the predetermined position, the brake is applied upon stopping the geared motor 18 to maintain the braking conditions so that the ball screw shafts 17, 17 receiving entire weight of the injection driving device can not be rotated and can not be lowered by weight thereof.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. An electric motor injection apparatus for a vertical molding machine, said vertical molding machine comprising:

a mold base on a machine bed;

a shaft for clamping which also serves as a tie bar provided through four corners of the mold base in a manner to move upwardly and downwardly freely;

a movable platen provided in a manner to lift and lower freely to the mold base, said movable platen being fixed on an upper end of said shaft for clamping;

a mold clamping mechanism accommodated in the machine bed, said mold clamping mechanism being connected with a lower end of said shaft for clamping;

an injection apparatus provided on the movable platen in a manner to lift and lower freely, said injection apparatus comprising a heating cylinder and a screw installed within said heating cylinder directed downwardly, so that a nozzle tip can be located on a gate formed on a central portion of a split mold of the movable platen side, said injection apparatus comprising:
an injection driving device comprising a lower plate to which a base end of said heating cylinder is connected; an upper plate above the lower plate connected by a connecting rod; an injection plate movable freely between the upper and the lower plates inserted through the connecting rod, said screw being connected rotatably to said injection plate; an injection driving means comprising a ball screw shaft and a ball nut, by which said injection plate is held to the upper plate; a driving source for the injection driving means provided on the upper plate; a metering driving source for rotating the screw provided on the injection plate; a supporting shaft mounted uprightly on an upper surface of said movable platen, said upper and lower plates being inserted and supported by said supporting shaft so as to lift and lower freely with relation to said movable platen;
a moving mechanism comprising a pair of ball screw shafts and ball nuts in bearing members over said movable platen and both sides of the lower plate of the heating cylinder so as to nozzle touches by moving the injection driving device upwardly and downwardly; and
a movement driving source for rotating the ball screw shafts,
wherein servo motors are used as said driving source for the injection driving means and said metering driving source, both the motors are respectively mounted on said upper plate and the injection plate in an inward direction each other longitudinally at the same position, making a space for the movement of the servo motor for said metering driving source.

2. An electric motor injection apparatus for a vertical molding machine according to claim 1, wherein said servo motor for said driving source for the injection driving means is provided with a brake, by which the braking conditions of the ball screw shaft of said injection driving means is held, thereby to block the advancing movement at stop of the injection screw due to self-weight of the injection plate.

3. An electric motor type injection apparatus for a vertical molding machine according to claim 1, wherein a geared motor with a brake is used as the driving source of said moving mechanism, by which the braking conditions of the ball screw shaft of said moving mechanism is held, thereby to block the self-rotation of the ball screw shaft by a load of the injection driving device.

4. An electric motor injection apparatus for a vertical molding machine according to claim 1, wherein the ball screw shaft of said moving mechanism is inserted and supported rotatably at an upper end thereof through said lower plate, a lower end is screwed to the ball nut installed in the bearing member provided on said movable platen to be connected to a movable platen and a rotation by the geared motor is transmitted by said ball nut by a driving belt wound over an axial end of the ball screw projected on the lower plate and an axial end of said geared motor to move in either direction of the upper or the lower by said ball nut in the bearing member, thereby said injection driving device being moved upwardly and downwardly to the movable platen.

5. An electric motor injection apparatus for a vertical molding machine according to claim 1, wherein said bearing member is provided with said ball nut movably only in the direction of the axis therein, and an apparatus for maintaining a nozzle touch force is constituted by a spring member for elastic pressurization which knocks up against to contact with the ball nut thereof in a cover member fixed to the upper to form a required space, a proximity switch installed on the side of the cover member thereof, and a detecting element mounted on the ball nut and located at a space underside the proximity switch.

6. An electric motor injection apparatus for a vertical molding machine according to claim 1, wherein said supporting shaft is installed on both sides of an opposite corner of the bearing sheet having an insertion hole for the heating cylinder tip, and a bearing member is installed longitudinally on both sides of a central portion of the bearing sheet, and the bearing sheet is placed on an upper surface of said movable platen movably in a transverse direction to install said injection driving device in a manner to lift and lower freely to the movable platen so that positioning of the nozzle tip of the heating cylinder and the gate of said mold can be performed by the lateral movement of the bearing sheet.

7. An electric motor injection apparatus for a vertical molding machine according to claim 6, wherein said the bearing sheet has loose holes as stopping holes fitted and installed in the four sides by a pair, and on the upper surface of the movable platen placed the bearing sheet, a receiving member which is located in the central portion of the side edge of the bearing sheet and on which nozzle centering screw is mounted by screwing from the outside horizontally is installed in a manner to project, and the bearing sheet installed within the movable platen surface inside the receiving member is secured slidably in a transverse direction by a bolt inserted to said stopping holes.

8. An electric motor injection apparatus for a vertical molding machine according to claim 2, wherein a geared motor with a break is used as the driving source of said moving mechanism, by which the breaking conditions of the ball screw shaft of said moving mechanism is held, thereby to block the self-rotation of the ball screw shaft by a load of the injection driving device.

9. An electric motor injection apparatus for a vertical molding machine according to claim 4, wherein said bearing member is provided with said ball nut movably only in the direction of the axis therein, and an apparatus for maintaining a nozzle touch force is constituted by a spring member for elastic pressurization which knocks up against to contact with the ball nut thereof in a cover member fixed to the upper to form a required space, a proximity switch installed on the side of the cover member thereof, and a detecting element mounted on the ball nut and located at a space underside the proximity switch.

10. An electric motor injection apparatus for a vertical molding machine according to claim 4, wherein said supporting shaft is installed on both sides of an opposite corner of the bearing sheet having an insertion hole for the heating cylinder tip, and a bearing member is installed longitudinally on both sides of a central portion of the bearing sheet, and the bearing sheet is placed on an upper surface of said movable platen movably in a transverse direction to install said injection driving device in a manner to lift and lower freely to the movable platen so that positioning of the nozzle tip of the heating cylinder and the gate of said mold can be performed by the lateral movement of the bearing sheet.

11. An electric motor injection apparatus for a vertical molding machine according to claim 5, wherein said supporting shaft is installed on both sides of an opposite corner of the bearing sheet having an insertion hole for the heating cylinder tip, and a bearing member is installed longitudinally on both sides of a central portion of the bearing sheet, and the bearing sheet is placed on an upper surface of said movable platen movably in a transverse direction to install said injection driving device in a manner to lift and lower freely to the movable platen so that positioning of the nozzle tip of the heating cylinder and the gate of said mold can be performed by the lateral movement of the bearing sheet.

12. An electric motor injection apparatus for a vertical molding machine according to claim 10, wherein said the bearing sheet has loose holes as stopping holes fitted and installed in the four sides by a pair, and on the upper surface of the movable platen placed the bearing sheet, a receiving member which is located in the central portion of the side edge of the bearing sheet and on which nozzle centering screw is mounted by screwing from the outside horizontally is installed in a manner to project, and the bearing sheet installed within the movable platen surface inside the receiving member is secured slidably in a transverse direction by a bolt inserted to said stopping holes.

13. An electric motor injection apparatus for a vertical molding machine according to claim 11, wherein said the bearing sheet has loose holes as stopping holes fitted and installed in the four sides by a pair, and on the upper surface of the movable platen placed the bearing sheet, a receiving member which is located in the central portion of the side edge of the bearing sheet and on which nozzle centering screw is mounted by screwing from the outside horizontally is installed in a manner to project, and the bearing sheet installed within the movable platen surface inside the receiving member is secured slidably in a transverse direction by a bolt inserted to said stopping holes.

* * * * *